(12) United States Patent
Carpenter et al.

(10) Patent No.: US 11,619,560 B2
(45) Date of Patent: Apr. 4, 2023

(54) PRESSURE RIPPLE MITIGATION IN PRESSURE SENSORS

(71) Applicant: Hamilton Sundstrand Corporation, Charlotte, NC (US)

(72) Inventors: Richard J. Carpenter, Gales Ferry, CT (US); Aaron V. Price, Westfield, MA (US); Russell P. Rourke, East Granby, CT (US); Lubomir A. Ribarov, West Hartford, CT (US); James J. Kamm, South Windsor, CT (US); Madi Kalibala, Bloomfield, CT (US); Brian K. Burbank, Unionville, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 626 days.

(21) Appl. No.: 16/656,926

(22) Filed: Oct. 18, 2019

(65) Prior Publication Data

US 2021/0116272 A1  Apr. 22, 2021

(51) Int. Cl.
| | |
|---|---|
| *G01L 19/00* | (2006.01) |
| *G01L 19/06* | (2006.01) |
| *B01D 29/60* | (2006.01) |
| *B01D 35/143* | (2006.01) |
| *G01F 1/20* | (2006.01) |

(52) U.S. Cl.
CPC .......... *G01L 19/0007* (2013.01); *G01F 1/206* (2013.01); *G01L 19/0609* (2013.01); *B01D 29/606* (2013.01); *B01D 35/143* (2013.01)

(58) Field of Classification Search
CPC . B01D 35/143; B01D 29/606; G01L 19/0007; G01L 19/0609
See application file for complete search history.

(56) References Cited

U.S. PATENT DOCUMENTS

| | | |
|---|---|---|
| 4,272,368 A | 6/1981 | Ford |
| 4,314,621 A | 2/1982 | Hansen |
| 4,932,205 A | 6/1990 | Alderfer |
| 5,475,976 A | 12/1995 | Phillips |
| 5,531,513 A | 7/1996 | Tackett |
| 5,588,805 A | 12/1996 | Geringer |

(Continued)

FOREIGN PATENT DOCUMENTS

| | | |
|---|---|---|
| EP | 2442085 | 4/2012 |
| EP | 3396346 | 10/2018 |

(Continued)

OTHER PUBLICATIONS

EP Extended Search Report for EP Application No. 19215566.1 dated Jul. 17, 2020.

*Primary Examiner* — Paul M. West
(74) *Attorney, Agent, or Firm* — Carlson, Gaskey & Olds, P.C.

(57) ABSTRACT

A fluid flow arrangement includes a manifold defining a fluid passage. A pressure sensor system is in fluid communication with the fluid passage. The pressure sensor system has a first sensor arranged along a first sense line and a second sensor arranged along a second sense line. The first and second sense lines are in fluid communication with the fluid passage. The first sense line has a first resonant frequency and the second sense line has a second resonant frequency. The second resonant frequency is different than the first resonant frequency.

13 Claims, 3 Drawing Sheets

(56) References Cited

U.S. PATENT DOCUMENTS

| | | | |
|---|---|---|---|
| 5,709,079 | A | 1/1998 | Smith |
| 5,961,309 | A | 10/1999 | Harpole |
| 6,073,656 | A | 6/2000 | Chen |
| 6,234,758 | B1 | 5/2001 | Pawelski |
| 6,308,723 | B1 | 10/2001 | Oboodi |
| 6,854,269 | B2 | 2/2005 | Hale |
| 7,036,530 | B2 | 5/2006 | Chen |
| 7,325,570 | B1 | 2/2008 | Krieger |
| 7,640,919 | B1 | 1/2010 | Smith |
| 8,337,179 | B2 | 12/2012 | Boock |
| 8,656,772 | B2 | 2/2014 | Qasimi |
| 9,152,151 | B2 | 10/2015 | Olbrisch |
| 10,302,516 | B2 | 5/2019 | DeRosa et al. |
| 2006/0130919 | A1 | 6/2006 | Ehmann et al. |
| 2007/0201989 | A1 | 8/2007 | Zhu |
| 2011/0209470 | A1 | 9/2011 | Dougan |
| 2012/0060482 | A1 | 3/2012 | Gonze |
| 2012/0090530 | A1 * | 4/2012 | Angus ................ G01L 19/0609 116/266 |
| 2012/0199206 | A1 | 8/2012 | Futa |
| 2012/0234770 | A1 | 9/2012 | Goodwin |
| 2013/0319103 | A1 | 12/2013 | Mulford |
| 2014/0294601 | A1 | 10/2014 | O'Shea |
| 2017/0282101 | A1 | 10/2017 | Ribarov et al. |

FOREIGN PATENT DOCUMENTS

| | | |
|---|---|---|
| WO | 9010147 | 9/1990 |
| WO | 0201055 | 1/2002 |
| WO | 2009130059 | 10/2009 |

\* cited by examiner

PRESSURE RIPPLE MITIGATION IN PRESSURE SENSORS

BACKGROUND

This disclosure relates to fluid flow systems, and more particularly to pressure sensors for fluid flow systems.

Aircraft fuel and oil systems typically incorporate external gear pumps. Often, fluid systems include a filtration system to remove contaminants from the fluid flow that could damage fluid system components. Such a filtration system may incorporate a filter that acts as a barrier to collect any contaminants. Typically, pressure sensors are placed in such fluid systems for system health monitoring and scheduling of fluid system component maintenance. Some known systems include multiple pressure sensors along a sense line for redundancy.

External gear pumps may be the source of pressure ripples, that is, oscillations generated by the periodic meshing and unmeshing of the teeth of the external gear pump. These oscillations create pressure ripples within the fluid in such fluid flow systems. Pressure ripples in the fluid flow may result in an inaccurate pressure reading at the pressure sensors.

SUMMARY

In one exemplary embodiment, a fluid flow arrangement includes a manifold defining a fluid passage. A pressure sensor system is in fluid communication with the fluid passage. The pressure sensor system has a first sensor arranged along a first sense line and a second sensor arranged along a second sense line. The first and second sense lines are in fluid communication with the fluid passage. The first sense line has a first resonant frequency and the second sense line has a second resonant frequency. The second resonant frequency is different than the first resonant frequency.

In a further embodiment of any of the above, the fluid flow arrangement is a gear pump.

In a further embodiment of any of the above, the pressure sensors are configured to measure a pressure drop across a filter element.

In a further embodiment of any of the above, the first sense line has a different hydraulic diameter than the second sense line.

In a further embodiment of any of the above, the first sense line has a different length than the second sense line.

In a further embodiment of any of the above, the first sense line has a different length than the second sense line.

In a further embodiment of any of the above, the second resonant frequency is at least twice the first resonant frequency.

In a further embodiment of any of the above, a third sense line is arranged within the arrangement. The third sense line has a third resonant frequency that is different than the first and second resonant frequencies.

In a further embodiment of any of the above, a signal from each of the first and second pressure sensors is sent to a controller.

In another exemplary embodiment, a fluid flow assembly includes a manifold that defines a fluid passage. A pump element is in fluid communication with the fluid passage. A filter element is in fluid communication with the fluid passage upstream of the pump element. A pressure sensor system is in fluid communication with the fluid passage near the filter element. The pressure sensor system has a first sensor that is arranged along a first sense line and a second sensor arranged along a second sense line. The first and second sense lines are in fluid communication with the fluid passage. The first sense line has a first resonant frequency and the second sense line has a second resonant frequency. The second resonant frequency is different than the first resonant frequency.

In a further embodiment of any of the above, the first sense line has a different hydraulic diameter than the second sense line.

In a further embodiment of any of the above, the first sense line has a different length than the second sense line.

In a further embodiment of any of the above, the second resonant frequency is at least twice the first resonant frequency.

In a further embodiment of any of the above, a third sense line is arranged within the assembly. The third sense line has a third resonant frequency that is different than the first and second resonant frequencies.

In another exemplary embodiment, a method of making a fluid passage pressure sensing arrangement includes fluidically coupling a first pressure sensor to a fluid passage of a manifold via a first sense line. A second pressure sensor is fluidically coupled to the fluid passage via a second sense line. The first sense line is tuned to have a first resonant frequency and the second sense line is tuned to have a second resonant frequency. The first resonant frequency is different than the second resonant frequency.

In a further embodiment of any of the above, the manifold is arranged in a fuel pump that has a geared pump element.

In a further embodiment of any of the above, a signal is sent from each of the first and second pressure sensors to a controller.

In a further embodiment of any of the above, the first and second pressure sensors are absolute pressure sensors.

In a further embodiment of any of the above, the first and second pressure sensors are differential pressure sensors.

In a further embodiment of any of the above, the tuning step comprises selecting a first length of the first sense line that is different than a second length of the second sense line.

BRIEF DESCRIPTION OF THE DRAWINGS

The disclosure can be further understood by reference to the following detailed description when considered in connection with the accompanying drawings.

DETAILED DESCRIPTION

Figure 1:
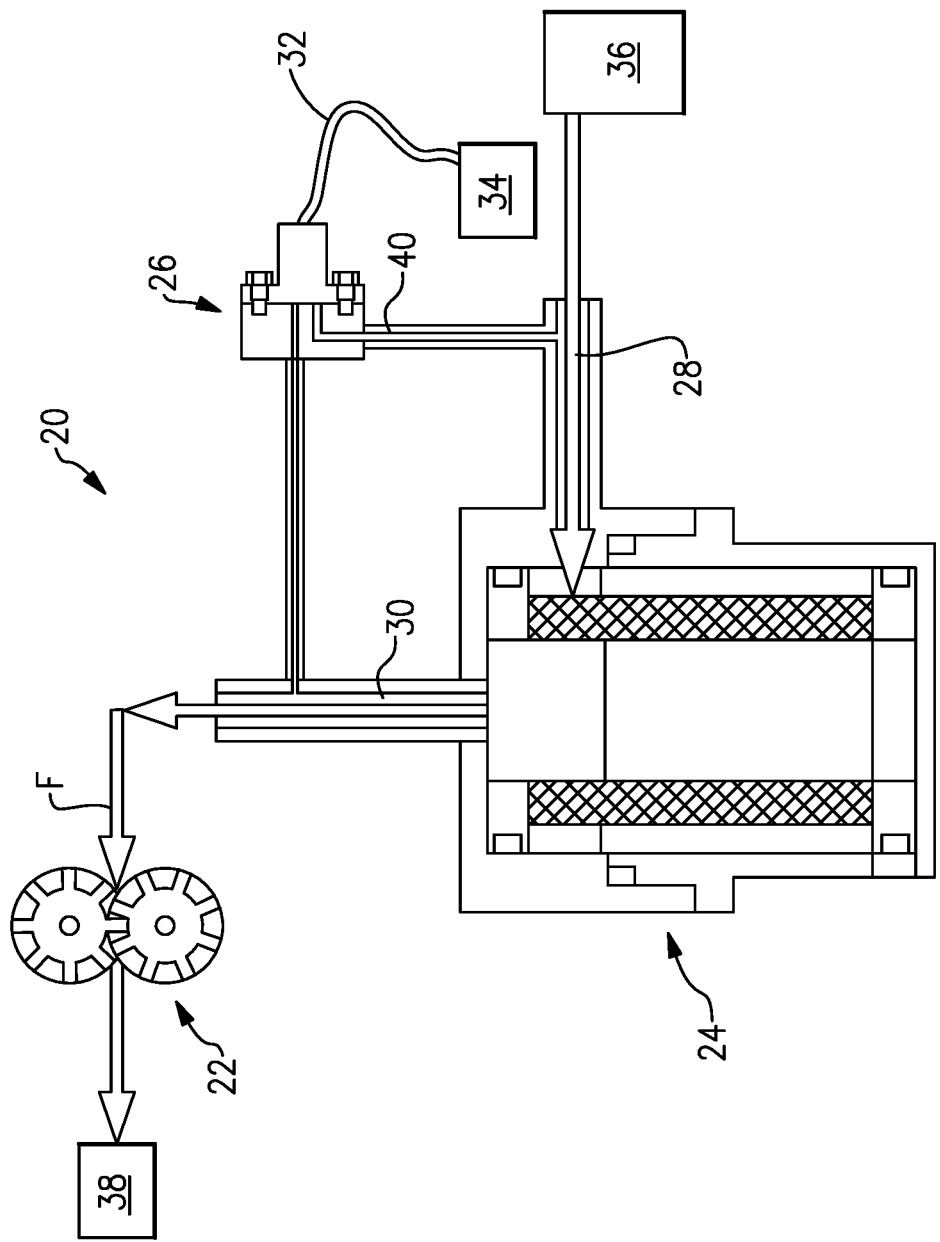
FIG. 1 is a schematic view of an exemplary fluid flow system

FIG. 1 shows an exemplary fluid flow system 20. The fluid flow system 20 includes a pump element 22 and a filter assembly 24 arranged upstream of the pump element 22. A fluid inlet line 28 directs a fluid flow into the filter assembly 24. The fluid passes through the filter assembly 24 and exits via a fluid outlet line 30. A pressure sensor system 26 is utilized to measure the pressure drop across the filter assembly 24. The pressure sensor system 26 may include a delta pressure sensor or an absolute pressure sensor, for example. An absolute pressure sensor detects the pressure at a particular point in the system 20. A delta pressure sensor senses pressure difference between the fluid flow upstream of the filter assembly 24 and downstream of the filter assembly 24. The pressure sensor system 26 may be located remote from the filter assembly 24. Sense lines connect the pressure sensor system 26 to the fluid they are measuring. The remote location of the pressure sensor system 26 may allow easier accessibility to the sensors for ease of maintenance and/or replacement. In some examples, the pressure sensor system 26 may send electronic signals to a controller 34 via a wiring harness 32. The controller 34 may be an electronic engine control (EEC), for example.

The fluid flow system 20 may be a fuel system for a gas turbine engine, for example. In this example, the fluid is fuel that flows from a fuel tank 36 through the filter element 24 and pump element 22 and into an engine 38. The engine may be a gas turbine engine, for example. Gas turbine engines are known, and may generally include a fan section, a compressor section, a combustor section and a turbine section, among other components. The gas turbine engine may be, for example, a two-spool turbofan gas turbine engine, a three-spool architecture, a direct drive turbofan (or turbojet), a geared drive turbofan, an industrial gas turbine (IGT), or any gas turbine engine as desired.

It should be appreciated that the present application is not limited to use in conjunction with a specific type of fluid flow system. Thus, although the present application is, for convenience of explanation, depicted and described as being implemented as a gear pump in a lubrication oil system, the present disclosure may be utilized elsewhere in a gas turbine engine, such as a centrifugal pump, or a positive displacement pump in a fuel system. This disclosure may also be implemented in numerous other machines having fluid flow systems.

Figure 2:
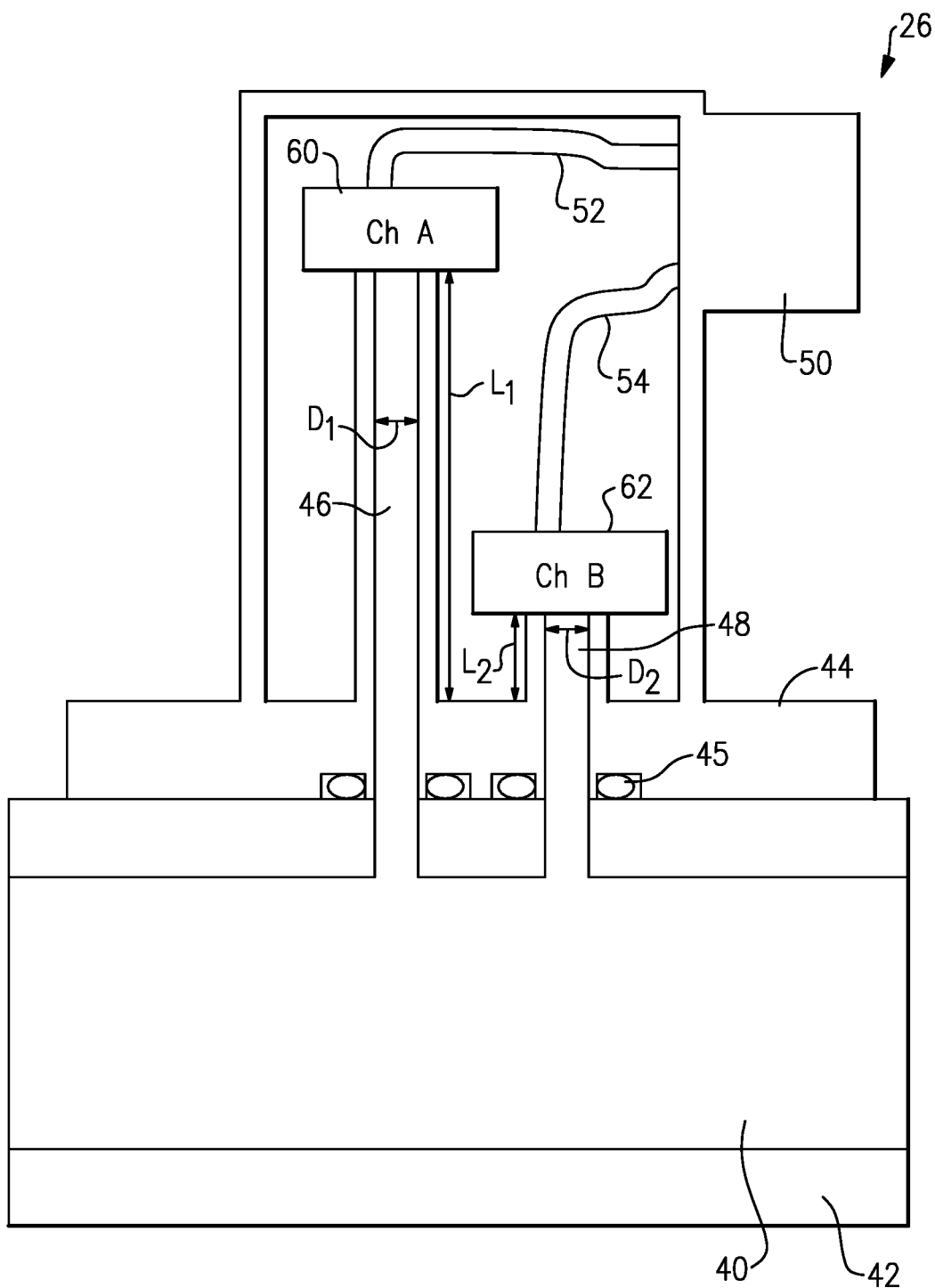
FIG. 2 is a schematic view of an example pressure sensor system.

FIG. 2 illustrates an example pressure sensor system 26. The pressure sensor system 26 detects the pressure of a fluid 40 flowing through a manifold 42. The sensor system 26 includes a first sensor 60 and a second sensor 62 arranged in a housing 44. Although the first and second sensors 60, 62 are shown in the same housing, in other examples, the first and second sensors 60, 62 may be arranged in separate housings. In this example, the first and second sensors 60, 62 are absolute pressure sensors. In other examples, the first and second sensors 60, 62 are delta or differential pressure sensors. The first sensor 60 is arranged along a first sense line 46 that is in fluid communication with the manifold 42. The second sensor 62 is arranged along a second sense line 48 that is in fluid communication with the manifold 42. In one example, O-rings 45 are used to seal the juncture between the manifold 42 and the first and second sense lines 46, 48. The first and second sensors 60, 62 are in communication with a connector 50 via a first and second wire harness 52, 54, respectively. The connector 50 may send data from the first and second sensors 60, 62 to the controller 34, for example.

Pressure oscillations in the fluid 40, such as from the pump element 22, may result in inaccurate pressure readings in the pressure sensors 60, 62, particularly when the pressure oscillations hit the resonant frequency of the sense line 46, 48. Typically, a shaft speed of the pump element 22 will set the forcing frequency of the pressure ripple. Thus, depending on engine speed, and pump shaft speed, the pressure ripple frequency will change during operation. The sensor system 26 may monitor the fluid system 20 over a large range of pump element operating speeds, and thus the pressure ripples may vary in frequency.

In this disclosed system, the first and second pressure sensors 60, 62 are arranged along first and second sense lines 46, 48. The first and second sense lines 46, 48 are in communication with the manifold 42 and communicate the fluid 40 to the first and second pressure sensors 60, 62. The first and second sense lines 46, 48 are designed to have different resonant frequencies. Resonant frequency of flow past an orifice depends on the length and hydraulic diameter of the sense line 46, 48, and the volume of fluid within the sense line. In the sensor system 26, the first sense line 46 has a first length $L_1$ and a first hydraulic diameter $D_1$, giving it a first resonant frequency. The second sense line 48 has a second length $L_2$ and a second hydraulic diameter $D_2$, giving it a second resonant frequency. The first resonant frequency is different than the second resonant frequency. In some examples, the first and second lengths $L_1$, $L_2$ are different from one another. In other examples, the first and second hydraulic diameters $D_1$, $D_2$ are different from one another. In other examples, both the length $L_1$ and hydraulic diameter $D_1$ of the first sense line 46 are different from the length $L_2$ and hydraulic diameter $D_2$ of the second sense line 48.

The unique resonant frequencies of the first and second sense lines 46, 48 avoid simultaneous resonance in both sensors 60, 62. Over the pump speed range, the first sensor 60 may provide erroneous signals when the first sense line 46 is in resonance, but the second sensor 62 should provide an accurate signal at that time. The second sensor 62 may provide erroneous signals when the second sense line 48 is in resonance, but the first sensor 60 should provide an accurate signal then. Thus, the sensors 60, 62 provide a clean pressure signal at all times. In some examples, the first resonance is at least twice the second resonance. This separation of resonances avoids overlapping resonant signals.

Figure 3:
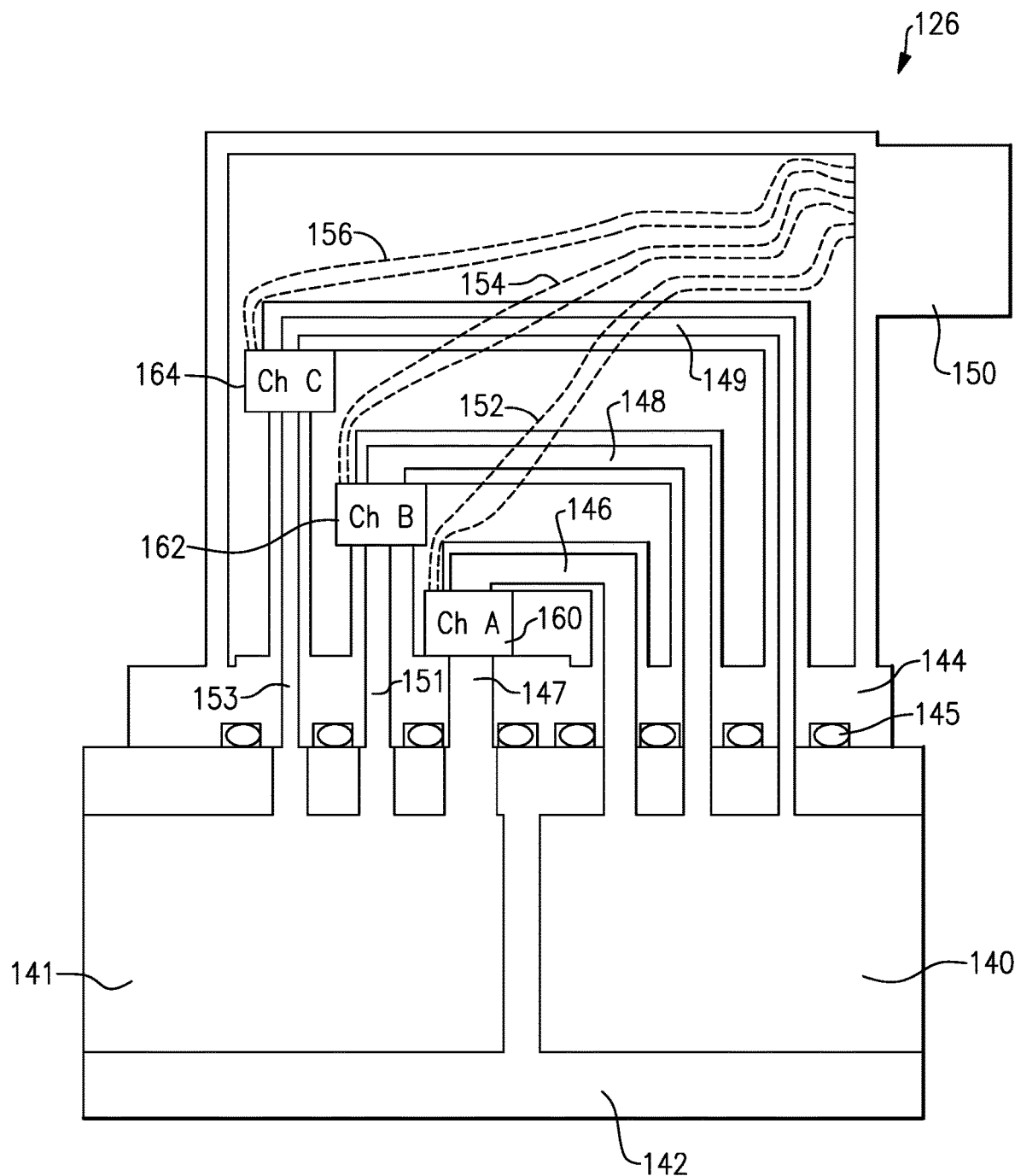
FIG. 3 is a schematic view of another example pressure sensor system.

FIG. 3 illustrates another example pressure sensor system 126. In this example system 126, the manifold 142 includes an upstream portion 140 and a downstream portion 141. In some examples, the upstream portion 140 is upstream of the filter element 24, while the downstream portion 141 is downstream of the filter element 24. The sensor system 126 includes a first pressure sensor 160 arranged along a first sense line 146, a second pressure sensor 162 arranged along a second sense line 148, and a third pressure sensor 164 arranged along a third sense line 149. Each of the first, second, and third sensors 160, 162, 164 is a differential pressure sensor, and is fluidly connected to the upstream portion 140 and the downstream portion 141. Upstream sense lines 146, 148, 149 fluidly connect the first, second, and third sensors 160, 162, 164 to the upstream portion 140. Downstream sense lines 147, 151, 153 fluidly connect the first, second, and third sensors 160, 162, 164 to the downstream portion 141. The sensors 160, 162, 164 thus detect a difference in pressure between the upstream and downstream portions 140, 141. Each of the first, second, and third sensors 160, 162, 164 is in communication with the connector 150 via a wire harness 152, 154, 156, respectively.

Each of the upstream and downstream sense lines 146, 148, 149, 147, 151, 153 has a different resonant frequency. In the illustrated example, the sense lines 146, 148, 149, 147, 151, 153 each have a different length. In the illustrated example, the sense lines 146, 148, 149, 147, 151, 153 each have a different diameter. In some examples, the sense lines 146, 148, 149, 147, 151, 153 have the same diameter but different lengths, or have the same length but different diameters. The different lengths and/or diameters of the sense lines 146, 148, 149, 147, 151, 153 provides a different resonant frequency for each sense line.

This configuration with three sensors 160, 162, 164 along different sense lines ensures that there will always be a clean signal from at least two of the sensors 160, 162, 164. When the pump element 22 is operating at a shaft speed causing resonance in one of the sensors 160, 162, 164, the other two sensors will still provide a useful signal. This arrangement may be beneficial in case one of the three sensors fails, as there will still be a useful signal.

Although an exemplary sensor system 26 utilizes two absolute pressure sensors, the system 26 could instead use three or more absolute pressure sensors. Although the exemplary sensor system 126 utilizes three differential pressure sensors, the system 126 could instead use two differential pressure sensors or more than three differential pressure sensors.

Each of the sensors 60, 62, 160, 162, 164 is connected to a connector 50, 150. The connector 50, 150 may be in communication with the controller 34, for example. The controller 34 may be an Engine Indicating and Crew Alerting System (EICAS) or an Engine Centralized Aircraft Monitor (ECAM), for example. The controller 34 may send a signal to an operator or maintenance crew when any of the sensors 60, 62, 160, 162, 164 has failed. In some examples, the controller 34 is configured to automatically alert a ground maintenance crew of impending maintenance or replacement of components within the fluid system 20 when the aircraft is on the ground.

In some examples, the sense lines 46, 48, 146, 148, 149 can be mapped. In one example, the sense lines 46, 48, 146, 148, 149 are selected based on the frequencies of pressure ripples over the entire operating speed range of the pump element 22. In another example, after the sense lines 46, 48, 146, 148, 149 are arranged, the controller 34 determines the behavior of each of the sense lines 46, 48, 146, 148, 149 over the operating speed range of the pump element 22, so that which sense lines 46, 48, 146, 148, 149 are in resonance at particular times is predictable. The controller 36 may then store this information, for example.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fluid flow arrangement, comprising:
   a manifold defining a fluid passage;
   a pressure sensor system in fluid communication with the fluid passage, the pressure sensor system having a first sensor arranged along a first sense line and a second sensor arranged along a second sense line, the first and second sense lines are each in fluid communication with the fluid passage, the first sense line having a first resonant frequency, and the second sense line having a second resonant frequency, the second resonant frequency being different than the first resonant frequency; and
   wherein the pressure sensors are configured to measure a pressure drop across a filter element, and the first and second sense lines being on a common side of the filter element.

2. The fluid flow arrangement of claim 1, wherein the fluid flow arrangement includes a gear pump.

3. The fluid flow arrangement of claim 1, wherein the first sense line has a different hydraulic diameter than the second sense line.

4. The fluid flow arrangement of claim 3, wherein the first sense line has a different length than the second sense line.

5. The fluid flow arrangement of claim 1, wherein the first sense line has a different length than the second sense line.

6. The fluid flow arrangement of claim 1, wherein the second resonant frequency is at least twice the first resonant frequency.

7. The fluid flow arrangement of claim 1, wherein a third sense line is arranged within the arrangement, the third sense line having a third resonant frequency that is different than the first and second resonant frequencies.

8. The fluid flow arrangement of claim 1, wherein a signal from each of the first and second pressure sensors is sent to a controller.

9. A fluid flow assembly, comprising:
   a manifold defining a fluid passage;
   a pump element in fluid communication with the fluid passage;
   a filter element in fluid communication with the fluid passage upstream of the pump element;
   a pressure sensor system in fluid communication with the fluid passage near the filter element, the pressure sensor system having a first sensor arranged along a first sense line and a second sensor arranged along a second sense line, the first and second sense lines are each in fluid communication with the fluid passage, the first sense line having a first resonant frequency, and the second sense line having a second resonant frequency, the second resonant frequency being different than the first resonant frequency;
   the first and second sense lines being on a common side of the filter element; and
   wherein a filter element is provided and associated upstream of the fuel pump, and the first and second sense lines are both on the same side of the filter element.

10. The fluid flow assembly of claim 9, wherein the first sense line has a different hydraulic diameter than the second sense line.

11. The fluid flow assembly of claim 9, wherein the first sense line has a different length than the second sense line.

12. The fluid flow assembly of claim 9, wherein the second resonant frequency is at least twice the first resonant frequency.

13. The fluid flow assembly of claim 9, wherein a third sense line is arranged within the assembly, the third sense line having a third resonant frequency that is different than the first and second resonant frequencies.

* * * * *